US009665262B2

(12) United States Patent
Hole

(10) Patent No.: US 9,665,262 B2
(45) Date of Patent: May 30, 2017

(54) ACTIVE PREVIEW CONTROL FADERS

(71) Applicant: Jonathan Robert Hole, Cardiff (GB)

(72) Inventor: Jonathan Robert Hole, Cardiff (GB)

(73) Assignee: Cooper Technologies Company, Houston, TX (US)

( * ) Notice: Subject to any disclaimer, the term of this patent is extended or adjusted under 35 U.S.C. 154(b) by 0 days.

(21) Appl. No.: 15/061,611

(22) Filed: Mar. 4, 2016

(65) Prior Publication Data
US 2016/0259540 A1 Sep. 8, 2016

Related U.S. Application Data

(60) Provisional application No. 62/129,584, filed on Mar. 6, 2015.

(51) Int. Cl.
G06F 3/0484 (2013.01)
G06F 3/0483 (2013.01)
H05B 37/02 (2006.01)
H05B 33/08 (2006.01)

(52) U.S. Cl.
CPC ........ G06F 3/04847 (2013.01); G06F 3/0483 (2013.01); H05B 33/0863 (2013.01); H05B 37/02 (2013.01); Y02B 20/341 (2013.01)

(58) Field of Classification Search
CPC ............ H05B 33/0863; H05B 33/0842; H05B 33/0857; H05B 33/086; H05B 37/02; H05B 33/0815; H05B 33/0845; H05B 33/0869; H05B 33/0872; H05B 37/0227; Y02B 20/346; F21Y 2115/10; A61N 2005/0663; H04N 21/4854; H04N 5/58; Y10S 715/961
See application file for complete search history.

(56) References Cited

U.S. PATENT DOCUMENTS 6,611,297 B1 * 8/2003 Akashi ............... H04N 21/4131
348/602
7,355,523 B2 * 4/2008 Sid ..................... H05B 37/0272
315/312

(Continued)

FOREIGN PATENT DOCUMENTS

| EP | 2515610 | 10/2012 |
|---|---|---|
| WO | WO 2007/105134 | 9/2007 |
| WO | WO 2012/168871 | 12/2012 |

OTHER PUBLICATIONS

European Search Report for EP 16158975.9 mailed Aug. 25, 2016.

Primary Examiner — Vibol Tan
(74) Attorney, Agent, or Firm — King & Spalding LLP

(57) ABSTRACT

An active color interface can include a first fader, where the first fader includes a first selector and a first range of selections. The active color interface can also include a second fader, where the second fader includes a second selector and a second range of selections. The first range of selections can be altered when the second selector moves among the second range of selections. The second range of selections can be altered when the first selector moves among the first range of selections. A light source of a lighting device can emit an overall color that corresponds to a first selection among the first range of selections by the first selector and a second selection among the second range of selections by the second selector.

20 Claims, 12 Drawing Sheets

(56) References Cited

U.S. PATENT DOCUMENTS

| | | | | |
|---|---|---|---|---|
| 8,581,513 B1* | 11/2013 | Reinoso | ............ | H05B 37/0272 |
| | | | | 315/185 S |
| 8,853,971 B2* | 10/2014 | Bennette | ............ | H05B 33/0863 |
| | | | | 315/185 S |
| 8,933,903 B2* | 1/2015 | Baaijens | ................ | H05B 37/02 |
| | | | | 315/292 |
| 9,049,757 B2* | 6/2015 | Yianni | ................... | G08C 23/04 |
| 9,144,140 B1* | 9/2015 | Bewick | ............. | H05B 37/0218 |
| 2009/0190327 A1 | 7/2009 | Adenau | | |
| 2015/0069916 A1* | 3/2015 | Fleming | ............... | H05B 37/029 |
| | | | | 315/131 |
| 2016/0262239 A1* | 9/2016 | Hole | ................... | G06F 3/04847 |

\* cited by examiner

ACTIVE PREVIEW CONTROL FADERS

RELATED APPLICATIONS

The present application claims priority under 35 U.S.C. §119(e) to U.S. Provisional Patent Application No. 62/129,584, filed on Mar. 6, 2015, and titled "Active Preview Control Faders." The entire content of the foregoing application is hereby incorporated herein by reference.

TECHNICAL FIELD

Embodiments described herein relate generally to color control, and more particularly to systems, methods, and devices for active preview color control faders.

BACKGROUND

Generally speaking, color has three characteristics or aspects that contribute to what people see. These characteristics (also called color factors herein) are hue, saturation, and value. The hue of a color is the point along the human visual spectrum of colors, real or perceived, (e.g., red, orange, yellow, green, blue, violet, and magenta) that the color falls. The saturation (also called chroma) is the purity of the color. The value (also called brightness or luminosity) is the lightness or darkness of the color.

SUMMARY

In general, in one aspect, the disclosure relates to an active color interface. The active color interface can include a first fader, wherein the first fader includes a first selector and a first range of selections. The active color interface can also include a second fader, wherein the second fader includes a second selector and a second range of selections. The first range of selections is altered when the second selector moves among the second range of selections. The second range of selections is altered when the first selector moves among the first range of selections. At least one light source of at least one lighting device emits an overall color that corresponds to a first selection among the first range of selections by the first selector and a second selection among the second range of selections by the second selector.

In another aspect, the disclosure can generally relate to a system for selecting a color. The system can include a light fixture having at least one light source, and an active color interface communicably coupled to the light fixture. The active color interface can include a hardware processor, and a color control engine communicably coupled to the light fixture, where the color control engine executes instructions on the hardware processor. The active color interface can also include a user interface communicably coupled to the color control engine, where the user interface displays a number of faders generated by the color control engine, where the faders include a number of selections based on the at least one light source. Each of the faders can be adjusted by the color control engine based on a position of a selector among each of the selections of the faders. Light emitted by the at least one light source can correspond to the position of each selector of the faders.

In yet another aspect, the disclosure can generally relate to a computer readable medium having computer readable program code embodied therein for a method for selecting a color using active preview color faders. The method can include displaying a number of faders, where each fader includes a selector positioned at a first selection along a range of selections for the first fader. The method can also include controlling a light output of a light fixture to emit a first color, where the first color matches a first overall color that combines the first selection of the faders. The method can further include receiving a first adjustment to the selector of a first fader, where the first adjustment moves the selector of the first fader from the first selection to a second selection along the range of selections for the first fader. The method can also include adjusting, based on the first adjustment, the range of selections for each of the faders to generate a number of adjusted faders. The method can further include controlling the light output of the light fixture to emit a second color, where the second color matches a second overall color that combines the second selection of the first fader and the first selection of a remainder of the adjusted faders.

These and other aspects, objects, features, and embodiments will be apparent from the following description and the appended claims.

BRIEF DESCRIPTION OF THE DRAWINGS

The drawings illustrate only example embodiments of active preview color faders and are therefore not to be considered limiting of its scope, as active preview color faders may admit to other equally effective embodiments. The elements and features shown in the drawings are not necessarily to scale, emphasis instead being placed upon clearly illustrating the principles of the example embodiments. Additionally, certain dimensions or positionings may be exaggerated to help visually convey such principles. In the drawings, reference numerals designate like or corresponding, but not necessarily identical, elements.

DETAILED DESCRIPTION OF EXAMPLE EMBODIMENTS

Figure 1:
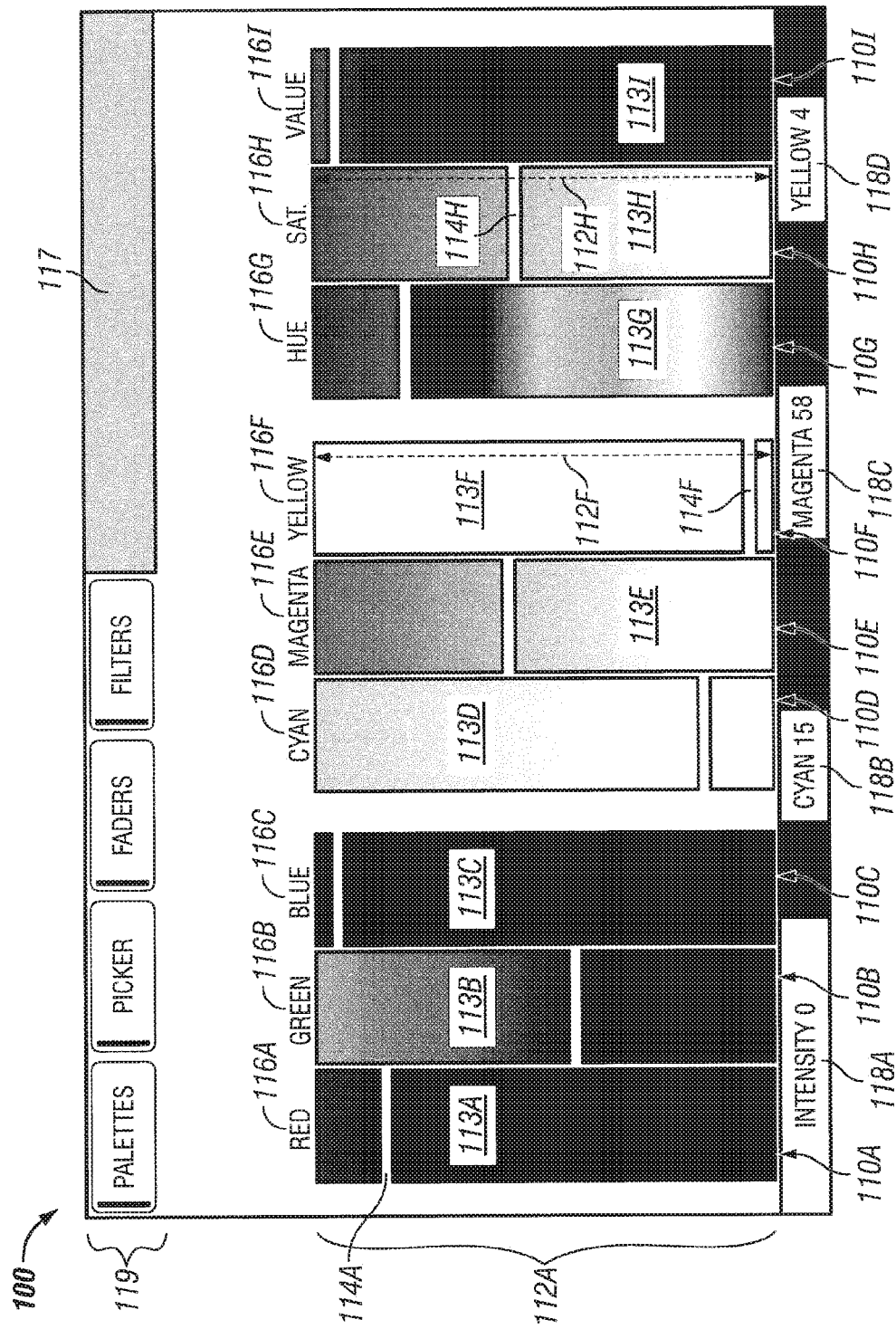
FIG. 1 shows a static color interface currently used in the art.

The example embodiments discussed herein are directed to systems, apparatuses, and methods of active preview control faders, which can also be referred to as active preview of colors using control faders. While example embodiments described herein are directed to use with lighting systems, example embodiments can also be used in systems having other types of devices. Examples of such other systems can include, but are not limited to, computer displays, electronic signs, mobile devices (e.g., tablets, smartphones), and televisions. Thus, example embodiments are not limited to use with lighting systems.

As described herein, a user can be any person that interacts with lighting systems, including example active preview control faders. Examples of a user may include, but are not limited to, a consumer, an electrician, an engineer, a mechanic, a lighting engineer, a lighting technician, a lighting designer, a lighting programmer, an instrumentation and control technician, a consultant, a contractor, an operator, and a manufacturer's representative.

For any figure shown and described herein, one or more of the components may be omitted, added, repeated, and/or substituted. Accordingly, embodiments shown in a particular figure should not be considered limited to the specific arrangements of components shown or described herein. Accordingly, example embodiments of active preview control faders should not be considered limited to the specific arrangements of components shown or described in any of the figures.

As defined herein, a fader is an indication of at least one color component or parameter. A fader can be interactive, so that a user can adjust one or more portions of a fader through an interface (such as an example active color interface described herein). As a result, a fader can provide control with respect to one or more color components or parameters. As described below, a fader can take any of a number of forms, and the movement that a fader can allow can be linear, curved, zig-zag, and/or any other suitable path. Further, a fader can exist in one dimension or multiple (e.g., two, three) dimensions.

Further, if a component of a figure is described but not expressly shown or labeled in that figure, the label used for a corresponding component in another figure can be inferred to that component. Conversely, if a component in a figure is labeled but not described, the description for such component can be substantially the same as the description for the corresponding component in another figure. The numbering scheme for the various components in the figures herein is such that each component is a three or four digit number and corresponding components in other figures have the identical last two digits.

In certain example embodiments, the active preview control faders (or portions thereof) described herein meet one or more of a number of standards, codes, regulations, and/or other requirements established and maintained by one or more entities. An example of such an entity can include, but is not limited to, the Professional Lighting and Sound Association (PLASA) and the United States Institute of Theater Technology (USITT).

Example embodiments of active preview control faders will be described more fully hereinafter with reference to the accompanying drawings, in which example embodiments of active preview control faders are shown. Active preview control faders may, however, be embodied in many different forms and should not be construed as limited to the example embodiments set forth herein. Rather, these example embodiments are provided so that this disclosure will be thorough and complete, and will fully convey the scope of active preview control faders to those of ordinary skill in the art. Like, but not necessarily the same, elements (also sometimes called components) in the various figures are denoted by like reference numerals for consistency.

Terms used herein such as, but not limited to, "top", "bottom", "left", "right", "first", and "second" are used merely to distinguish one component (or part of a component or state of a component) from another. Such terms are not meant to denote a preference or a particular orientation. Also, the names given to various components described herein are descriptive of one or more embodiments and are not meant to be limiting in any way. Those of ordinary skill in the art will appreciate that a feature and/or component shown and/or described in one embodiment (e.g., in a figure) herein can be used in another embodiment (e.g., in any other figure) herein, even if not expressly shown and/or described in such other embodiment.

FIG. 1 shows a static color interface 100 currently used in the art. The static color interface 100 of FIG. 1 includes a number of faders 110, where each fader 110 corresponds to a component (also called a parameter or channel) of color. Specifically, in this case, there are nine faders 110: Fader 110A is for red, fader 110B is for green, fader 110C is for blue, fader 110D is for cyan, fader 110E is for magenta, fader 110F is for yellow, fader 110G is for hue, fader 110H is for saturation, and fader 110I is for value.

Each fader 110 includes a range 112 of selections 113 and a selector 114 that moves within the range 112 of selections 113 to select a value for that particular component. Each fader 110 also includes a label 116 to designate the component of the fader 110. For example, as shown in FIG. 1, the fader 110 on the far left is fader 110A, having a range 112A of selections 113A, a selector 114A that is movable within the range 112A of selections 113A, and a label 116A to designate that the fader 110A is for the red component of the color.

The selections 113 within a range 112 provide a visual image of what can be selected when the selector 114 is moved to a particular position within the range 112. With a static color interface 100 known in the art, the selections 113 within the range 112 for each fader 110 remain static. In other words, as a selector 114 is moved to a new selection 113 within the range 112 of a particular fader 110, the selections 113 within the ranges 112 of the other faders 110 of the static color interface 100 remain unchanged. This makes it difficult for a user to determine how the selection 113 of one component (in one fader 110) affects the other components of the color.

The static color interface 100 can include one or more of a number of other features. For example, as shown in FIG. 1, the static color interface 100 can include an overall color display 117, where the overall color, based on the position of the various selectors 114 of each fader 110, is shown. Again, while adjusting the position of a selector 114 of a fader 110 can change the overall color display 117, the user does not know how a particular position of a selector 114 of a particular fader 110 changes the overall color shown in the overall color display 117 except by trial and error, after the fact.

As additional examples of features of the static color interface 100 of FIG. 1 are the tab selections 119 and the numeric indicators 118. The tab selections 119 allow a user to select from among a number of options (in this case, pallettes, picker, faders, and filters, where faders is selected) to help the user select an overall color. In certain example embodiments, a tab selection 119 can correspond to one or more light fixtures within a lighting system. In addition, or in the alternative, a tab selection 119 can correspond to one or more light sources within a light fixture. If a tab selection 119 is not designated for selection of one or more light fixtures, then light fixtures can be selected in one or more of a number of other ways, including but not limited to default values, command code, and activation of a light fixture.

The numeric indicators 118 assign a numeric value to something associated with the faders 110. In this example, the numeric indicators show that, based on the current positions of the selectors 114 for the faders 110, the cyan is at a value of 15 (e.g., 15%, 15 in a range between zero and 255, as with DMX values), the magenta is at a value of 58, and the yellow is at a value of 4. Again, even with the numeric indicators 118, a user does not know how any of these numeric values 118 change the overall color shown in the overall color display 117 except by trial and error, after the fact.

Figure 2A:
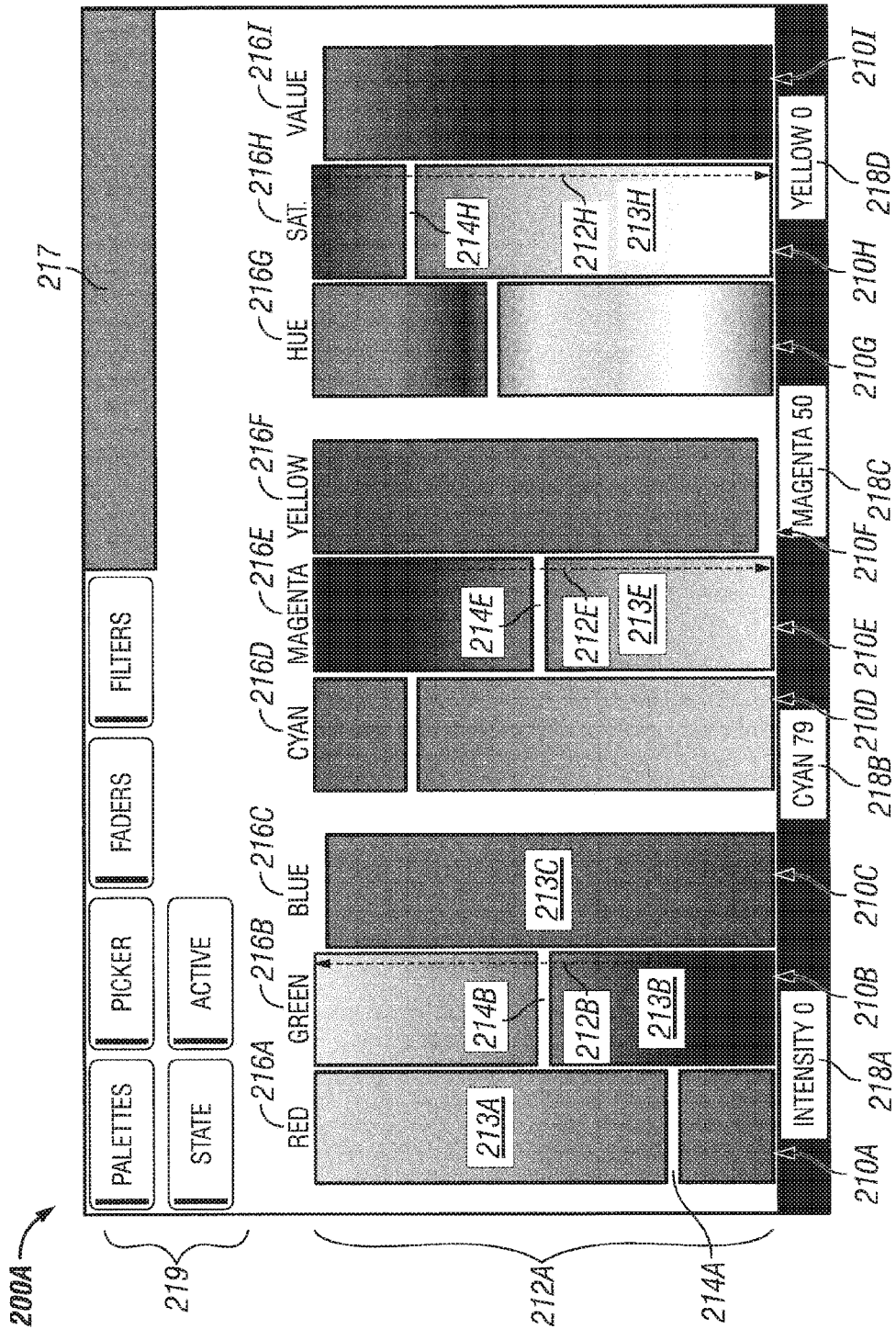
FIGS. 2A and 2B each shows an active color interface in accordance with certain example embodiments.
Figure 2B:
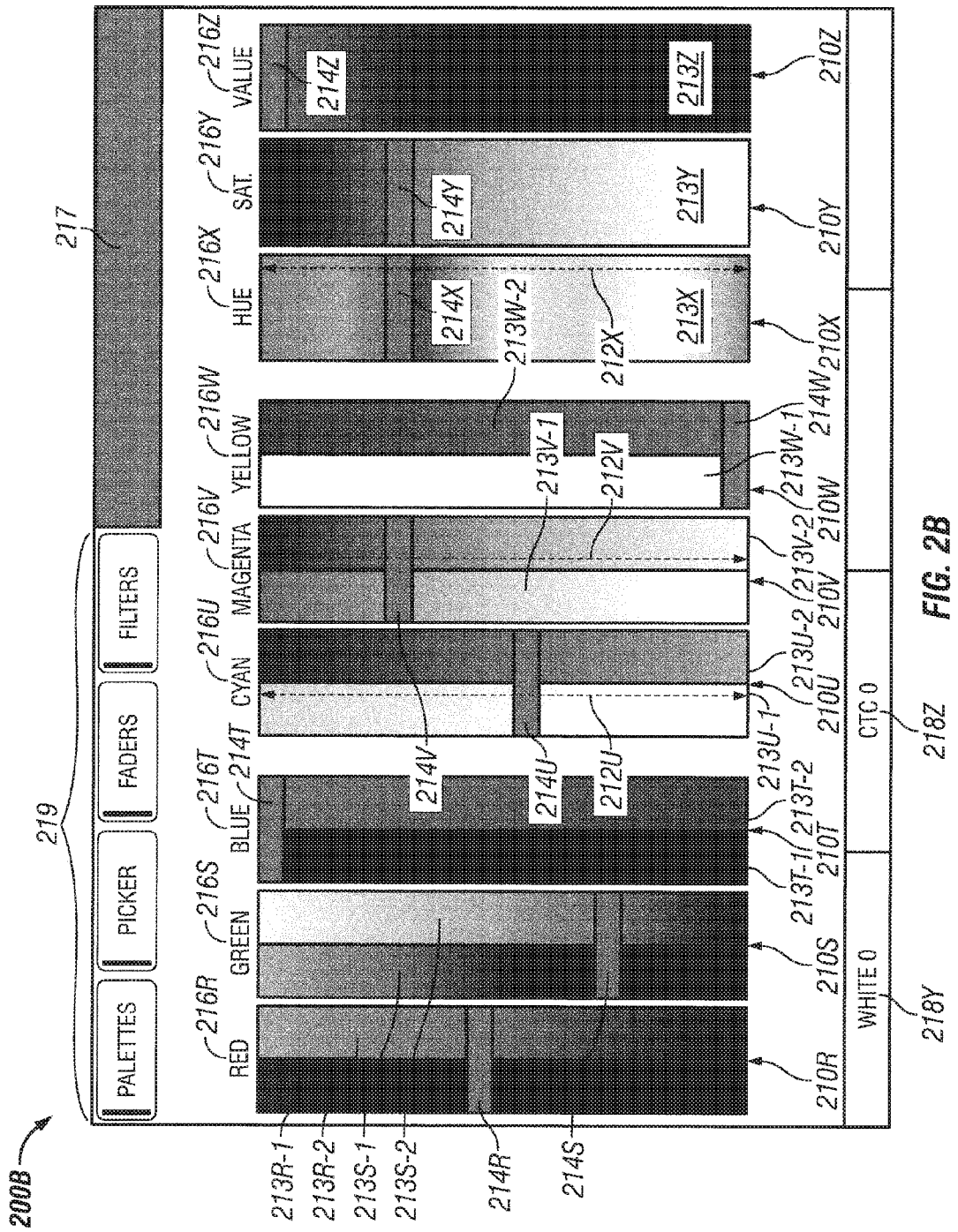

By contrast, FIGS. 2A and 2B each shows an active color interface 200 in accordance with certain example embodiments. Similar to the interface 100 of FIG. 1, the static color interface 200A of FIG. 2A includes a number of faders 210, where each fader 210 corresponds to a component of color. Specifically, in this case, there are nine faders 210: Fader 210A is for red, fader 210B is for green, fader 210C is for blue, fader 210D is for cyan, fader 210E is for magenta, fader 210F is for yellow, fader 210G is for hue, fader 210H is for saturation, and fader 210I is for value.

Similarly, each fader 210 includes a range 212 of selections 213 and a selector 214 that moves within the range 212 of selections 213 to select a value for that particular component of color. Each fader 210 also includes a label 216 to designate the component of the fader 210. For example, as shown in FIG. 2, the fader 210 on the far left is fader 210A, having a range 212A of selections 213A, a selector 214A that is movable within the range 212A of selections 213A, and a label 216A to designate that the fader 210A is for the red component of the color.

As with the static color interface 100, the selections 213 within a range 212 provide a visual image of what can be selected when the selector 214 is moved to a particular position within the range 212. However, unlike the static color interface 100 of FIG. 1, the selections 213 within the range 212 for each fader 210 of the active color interface 200 change. In other words, as a selector 214 is moved to a new selection 213 within the range 212 of a particular fader 210 (e.g., fader 210C), each of the selections 213 within the ranges 212 of the other faders 210 of the active color interface 200A of FIG. 2A change based on the new selection. This makes it easy for a user to determine how the selection 213 of one component (in one fader 210) affects the other components of the color.

By dynamically updating the selections 213 within the range 212 of every fader 210 (component or parameter or channel of color), the active color interface 200A of FIG. 2A can clearly show the resulting color of adding or subtracting any of the color components by any amount. The color beneath the selector 214 of each fader 210 is exactly the same color. In some cases, a fader 210 may not show a full range of changes while the other faders 210 do. For example, fader 210G with a label 216G of hue may not change as extensively because the range 212G is shown at full saturation. Nevertheless, the range 212G of the fader 210G shows at least a partial set of values for hue.

In certain example embodiments, the faders 210 used in an active color interface (e.g., active color interface 200A) are based on the capabilities of the device (e.g., a light fixture) that is communicably coupled to the active color interface. In addition, or in the alternative, not all of the faders 210 of the active color interface 200A can actively be manipulated (move a selector 214 among a range 212 of selections 213 for a fader 210) by a user. In such a case, when a selector of another fader is moved, the selections of the inactive fader (as well as all of the other faders 210 of the active color interface 200A) can still change, even though the selector of that inactive fader cannot be moved by the user.

As discussed above, the number of faders 210 and the color component that each fader 210 represents can vary. For example, there can be six faders 210 that correspond to a six-color system. In other words, the active color interface can have six faders 210, one for red, one for green, one for blue, one for amber, one for white, and one for indigo/UV. As another example, there can be seven faders 210 that correspond to a seven-color system. In other words, the active color interface can have seven faders 210, one for red, one for lime, one for amber, one for green, one for cyan, one for blue, and one for indigo.

The active color interface 200B of FIG. 2B effectively combines the active color interface 200A of FIG. 2A with the static color interface 100 of FIG. 1. Specifically, the active color interface 200B of FIG. 2B has a total of nine faders 210, which include fader 210R, fader 210S, fader 210T, fader 210U, fader 210V, fader 210W, fader 210X, fader 210Y, and fader 210Z. Three of the faders 210 (specifically, fader 210X, fader 210Y, and fader 210Z) are substantially similar to fader 210G, fader 210H, and fader 210I, respectively, of FIG. 2A.

Six of the faders 210 (fader 210R, fader 210S, fader 210T, fader 210U, fader 210V, and fader 210W) of FIG. 2B are split into two portions. One portion (in this example, the right half) of fader 210R, fader 210S, fader 210T, fader 210U, fader 210V, and fader 210W are substantially similar to fader 210A, fader 210B, fader 210C, fader 210D, fader 210E, and fader 210F, respectively, of FIG. 2A. Therefore, the selections 213 (in this case, selection 213R-2, selection 213S-2, selection 213T-2, selection 213U-2, selection 213V-2, and selection 213W-2) of each fader 210 (in this case, fader 210R, fader 210S, fader 210T, fader 210U, fader 210V, and fader 210W) are substantially the same as selection 213A, selection 213B, selection 213C, selection 213D, selection 213E, and selection 213F, respectively, of FIG. 2A.

Another portion (in this example, the left half) of fader 210R, fader 210S, fader 210T, fader 210U, fader 210V, and fader 210W are substantially similar to fader 110A, fader 110B, fader 110C, fader 110D, fader 110E, and fader 210F, respectively, of FIG. 1. Therefore, the selections 213 (in this case, selection 213R-1, selection 213S-1, selection 213T-1, selection 213U-1, selection 213V-1, and selection 213W-1) of each fader 210 (in this case, fader 210R, fader 210S, fader 210T, fader 210U, fader 210V, and fader 210W) are substantially the same as selection 113A, selection 113B, selection 113C, selection 113D, selection 113E, and selection 113F, respectively, of FIG. 1.

In addition, the selectors 214 of FIG. 2B are different than the selectors 214 of FIG. 2A. In FIG. 2B, selector 214R, selector 214S, selector 214T, selector 214U, selector 214V, selector 214W, selector 214X, selector 214Y, and selector 214Z correspond to 210R, fader 210S, fader 210T, fader 210U, fader 210V, fader 210W, fader 210X, fader 210Y, and fader 210Z, respectively. In this case, each selector 214 of FIG. 2B is colored as the overall color shown in the overall color display 217. In this way, if the overall color display 217 is not included in the active color interface 200B, then the user can still see the overall color shown by each selector 214. As with the overall color display 217, each of the selectors 214 of FIG. 2B changes in real-time as a selection of any of the faders 210 changes.

Other features of the example active color interfaces (active color interface 200A, active color interface 200B) that are common with the static color interface 100 currently used in the art now become much more effective in proactively assisting a user to select a desired color. Specifically, the overall color display 217, the numeric indicators 218, and the tab selectors, all optional features on the active color interfaces 200, allow a user to much more intuitively and efficiently adjust various faders 210 to achieve a desired overall color, as shown in the overall color display 217.

The faders 210 of the example active control interfaces (e.g., static color interface 200A, static color interface 200B) are shown as slidebars. However, the faders 210 can have any more of a number of forms, including but not limited to radio buttons, rotary switches, curved segments, circles, and rotary dials. Further, a fader 210 can be straight (as shown in FIG. 2), curved, circular, hexagonal, or any other shape and/or structure. In addition, a fader 210 can have any of a number of orientations on the active control interface 200, including but not limited to vertical (as shown in FIGS. 2A and 2B), horizontal, diagonal, and random. A fader can represent a depiction of a single component of a color, as with the faders 210 of FIGS. 2A and 2B. A fader can also represent a depiction of multiple components of a color. In such a case, the fader can be a form having one or multiple (e.g., two, three) dimensions. Examples of such forms can include, but are not limited to, a pie chart, a cone, a cylinder, a sphere, a circle, and a triangle.

The active control interfaces 200 described herein can be a graphical user interface (GUI) that is accessible on one or more of a number of devices. Examples of such devices can include, but are not limited to, a stand-alone device, a wall-mounted device, a mobile device (e.g., cell phone, tablet, laptop computer), and a desktop computer. Alternatively, example active control interfaces can be a GUI that is accessible at a point or area of space.

Figure 3:
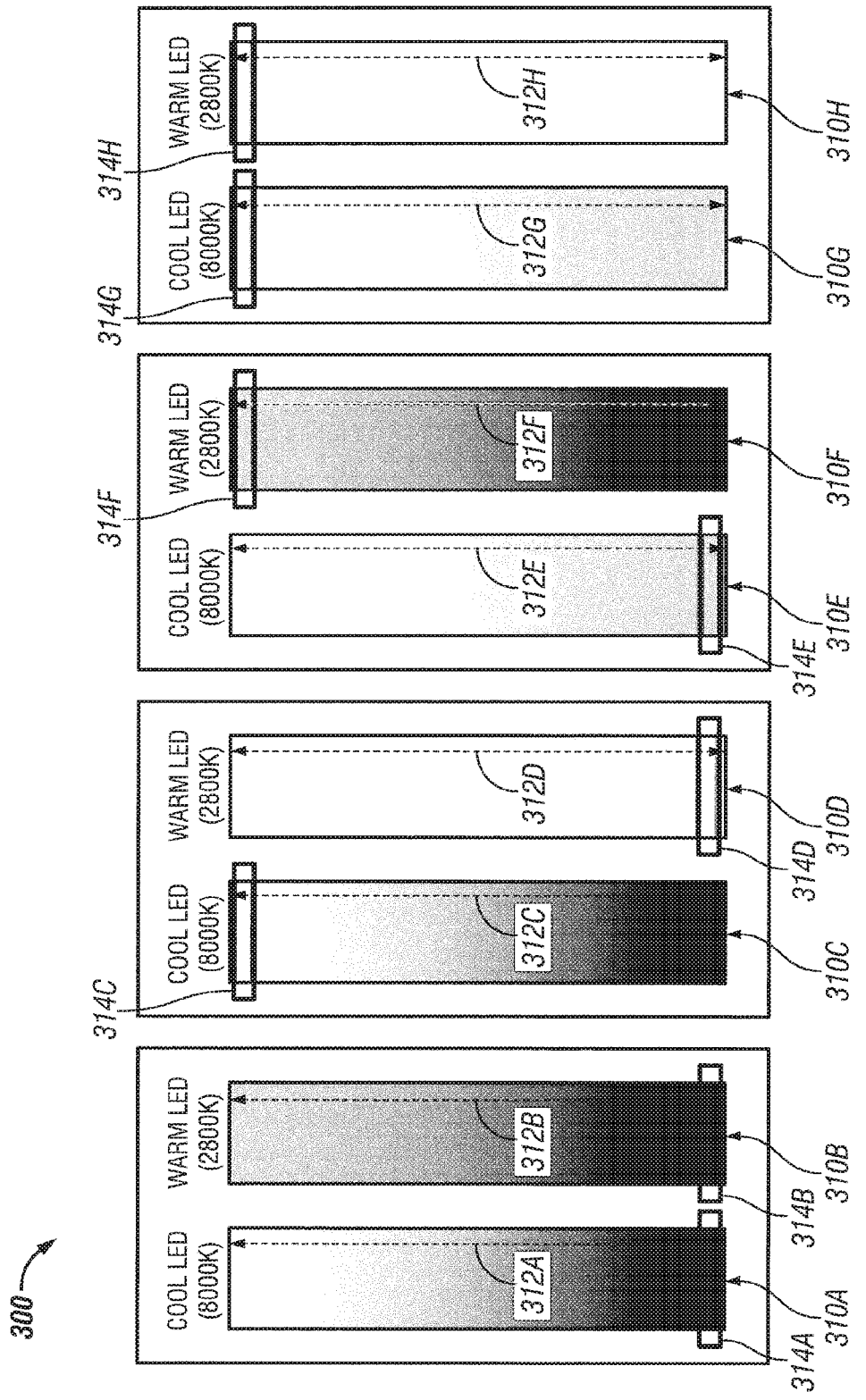
FIG. 3 shows another active color interface in accordance with certain example embodiments.

FIG. 3 shows another active color interface 300 in accordance with certain example embodiments. The active color interface 300 of FIG. 3 is substantially the same as the active color interfaces 200 of FIGS. 2A and 2B, except that in this case, there are eight faders 310 matched in pairs for controlling warm white color (also called amber) and cool white color (also simply called white) for four different lighting fixtures. Specifically, fader 310A is cool color and fader 310B is warm color for one lighting fixture; fader 310C is cool color and fader 310D is warm color for a second lighting fixture; fader 310E is cool color and fader 310F is warm color for a third lighting fixture; and fader 310G is cool color and fader 310H is warm color for a fourth lighting fixture.

As shown in the active color interface 300 of FIG. 3, the selections 313 of one of faders 310 are dependent upon the selection 313 of the other fader 310 in the respective pair of faders 310. When matched in pairs (in this case, fader 310A paired with fader 310B, fader 310C paired with fader 310D, fader 310E paired with fader 310F, and fader 310G paired with fader 310H), and when the selections 313 of the faders 310 in each pair are at an extreme within its respective range 312, the difference in available colors within each range 312 is more pronounced. In certain example embodiments, one or more faders (e.g., faders 310) associated with temperature of color can be combined into an active color interface with faders (e.g., faders 210) associated with particular colors. Further, as explained above, an active color interface can have any of a number of faders.

Figure 4:
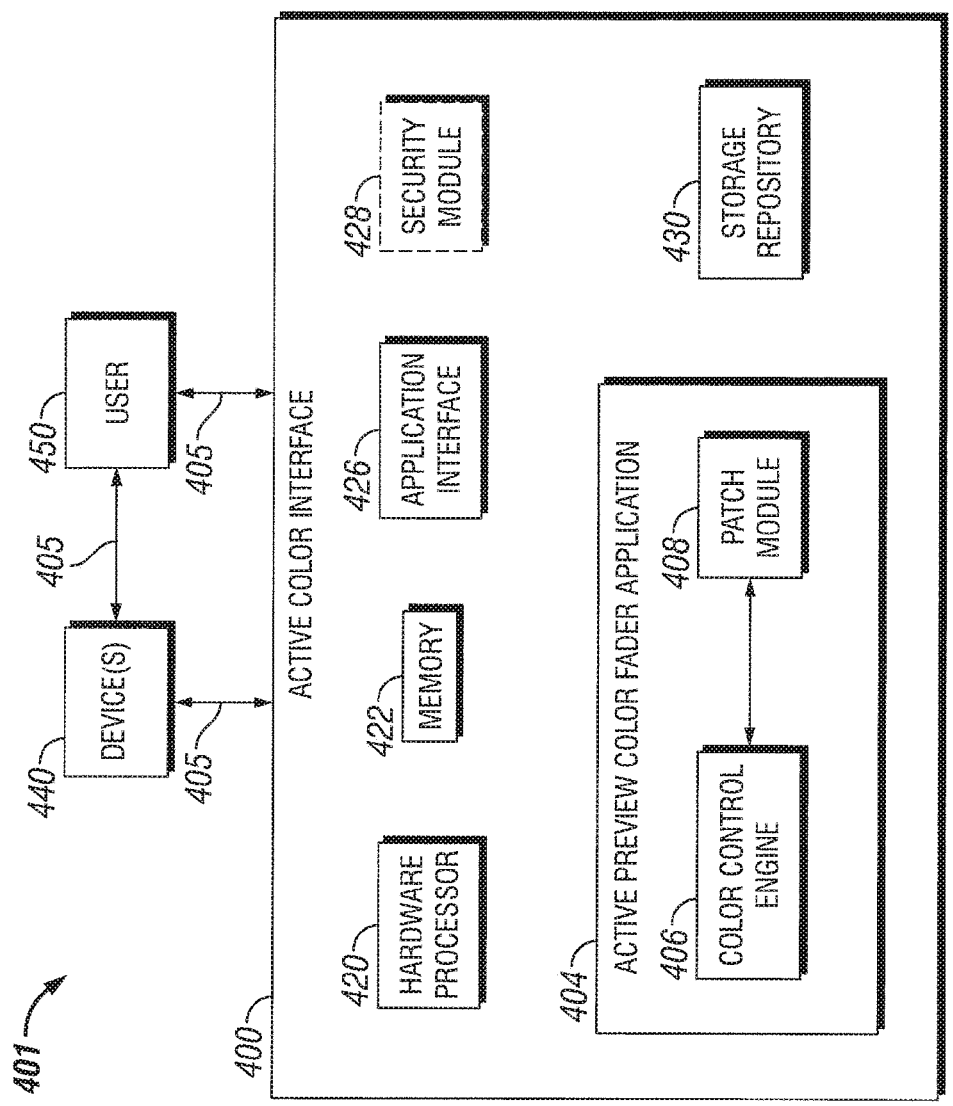
FIG. 4 shows a diagram of a system in accordance with certain example embodiments.

FIG. 4 shows a system diagram of system 401 in accordance with certain example embodiments. The system 401 can include the one or more devices 440, a user 450, and an active color interface 400, which are coupled to each other using one or more communication links 405. The active color interface 400 can include an active preview color fader application 404, a storage repository 430, a hardware processor 420, a memory 422, an application interface 426, and, optionally, a security module 428. The active preview color fader application 404 can include a color control engine 406 and a patch module 408.

Each of these components is described in further detail below. Example embodiments are not limited to the configuration shown in FIG. 4 and discussed herein. Additionally, although certain components have been enumerated as being part of the system 401, it is understood that some components are combined with other components and/or some components are further divided into additional components in other alternative example embodiments. Further, a component described in FIG. 4 can be located anywhere (e.g., within an enclosure, remotely) relative to one or more other components of FIG. 4.

Each communication link 405 can include wired (e.g., Class 1 electrical cables, Class 2 electrical cables, electrical connectors, power line carrier, RS485) and/or wireless (e.g., Wi-Fi, visible light communication, cellular networking, Bluetooth, WirelessHART, ISA100) technology. A communication link 405 can transmit signals (e.g., power signals, communication signals, control signals, data) between the active color interface 400 and the user 450 and/or the devices 440.

The user 450 is the same as a user defined above. The user 450 can use a user system (not shown), which may include a display (e.g., a GUI). The user 450 interacts with the active color interface 400 via the application interface 426 and one or more communication links 405. The device 440 can be one or more devices that use color. Examples of a device 440 can include, but are not limited to, a lighting fixture, a computer display, an electronic sign, and a television. Each device 440 can have information associated with it. Such information (also called device information) can include, but is not limited to, a model number, a number of light sources, a type of each light source, color capabilities of each light source, age of each light source.

The user 450 and/or the devices 440 can interact with the active color interface 400 using an application interface 426 in accordance with one or more example embodiments. Specifically, the application interface 426 of the active color interface 400 receives input data (e.g., information, communications) from and sends output data (e.g., information, communications) to the user 450 and/or each device 440. The user 450 and/or each device 440 can include an interface to receive data from and send data to the active color interface 400 in certain example embodiments. Examples of this interface include, but are not limited to, a graphical user interface, a touchscreen, an application programming interface, a keyboard, a monitor, a mouse, a web service, a data protocol adapter, some other hardware and/or software, or any suitable combination thereof.

The storage repository 430 can be a persistent storage device (or set of devices) that stores software and data used to assist the color control engine 406 in communicating with the user 450 and the devices 440 within the system 401. In one or more example embodiments, the storage repository 430 stores the device information. Examples of a storage repository 430 include, but are not limited to, a database (or a number of databases), a file system, a hard drive, flash memory, some other form of solid state data storage, or any suitable combination thereof. The storage repository 430 is located on multiple physical machines, each storing all or a portion of the device information according to some example embodiments. Each storage unit or device can be physically located in the same or different geographic location.

The storage repository 430 can be operatively connected to the active preview color fader application 404. In one or more example embodiments, the active preview color fader application 404 includes functionality to communicate with the devices 440 and the user 450 in the system 401. More specifically, the active preview color fader application 404 sends information to and/or receives information from the storage repository 430 in order to communicate with the devices 440 and/or the user 450.

The patch module 408 of the active preview color fader application 404 retrieves and stores device information stored in the storage repository 430. Further, the patch module 408 shares the device information with the color control engine 406. The patch module 408 can interface with the storage repository 430 based on instructions provided to the patch module 408 by the color control engine 406.

In certain example embodiments, the color control engine 406 configures and sends the faders 210 to the user 450 through the application interface 426. The characteristics (e.g., number of faders, number of color parameters for a fader, form of a fader) of a fader 210 can be determined by the color control engine 406 based on the device information supplied by the patch module 408. The color control engine 406 can also receive data (e.g., repositioning of a selector 214 in a range 212 of selection 213 for a fader 210) and adjust all of the faders 210 based on the data.

The functions of the active preview color fader application 404 can be performed on a single computing device or on multiple computing devices. When the functions of the active preview color fader application 404 are performed on multiple computing devices, a number of configurations and/or frameworks are used in certain example embodiments. The configurations and/or software frameworks are designed to work with multiple data nodes and large quantities of data. One or more calculations performed by one or more components of the active preview color fader application 404 are performed on multiple machines operating in parallel, where the results from each machine is combined to generate a result to the one or more calculations.

The hardware processor 420 of the active color interface 400 executes software in accordance with one or more example embodiments. Specifically, the hardware processor 420 can execute software on the active color interface 400 or any portion thereof, as well as software used by the user 450 and/or one or more devices 440. The hardware processor 420 can be an integrated circuit, a central processing unit, a multi-core processing chip, a multi-chip module including multiple multi-core processing chips, or other hardware processor in one or more example embodiments. The hardware processor 420 is known by other names, including but not limited to a computer processor, a microprocessor, and a multi-core processor.

In one or more example embodiments, the hardware processor 420 executes software instructions stored in memory 422. The memory 422 includes one or more cache memories, main memory, and/or any other suitable type of memory. The memory 422 is discretely located on the active color interface 400 relative to the hardware processor 420 according to some example embodiments. In certain configurations, the memory 422 also is integrated with the hardware processor 420.

Optionally, in one or more example embodiments, the security module 428 secures interactions between the active color interface 400, the user 450, and/or the devices 440. More specifically, the security module 428 authenticates communication from software based on security keys verifying the identity of the source of the communication. For example, user software may be associated with a security key enabling the software of the user 450 to interact with the active color interface 400 and/or the devices 440. Further, the security module 428 restricts receipt of information, requests for information, and/or access to information in some example embodiments.

The user 450, the active color interface 400, and devices 440 can use their own system or share a system in certain example embodiments. Such a system can be, or contain a form of, an Internet-based or an intranet-based computer system that is capable of communicating with various software. A computer system includes any type of computing device and/or communication device, including but not limited to the active color interface 400. Examples of such a system can include, but are not limited to, a desktop computer with LAN, WAN, Internet or intranet access, a laptop computer with LAN, WAN, Internet or intranet access, a smart phone, a server, a server farm, an android device (or equivalent), a tablet, smartphones, and a personal digital assistant (PDA). Such a system can correspond to a computer system as described below with regard to FIG. 6.

Further, as discussed above, such a system can have corresponding software (e.g., user software, device software, computer system software). The software can execute on the same or a separate device (e.g., a server, mainframe, desktop personal computer (PC), laptop, personal desktop assistant (PDA), television, cable box, satellite box, kiosk, telephone, mobile phone, or other computing devices) and can be coupled by the communication network (e.g., Internet, Intranet, Extranet, Local Area Network (LAN), Wide Area Network (WAN), or other network communication methods) and/or communication channels, with wire and/or wireless segments according to some example embodiments. The software of one system can be a part of, or operate separately but in conjunction with, the software of another system within the system 401.

In certain example embodiments, the active color interface 400 does not include a hardware processor 420. In such a case, the active color interface 400 can include, as an example, one or more integrated circuits (ICs) or one or more field programmable gate arrays (FPGA). Using ICs, FPGAs, and/or other similar devices known in the art allows the active color interface 400 to be programmable and function according to certain logic rules and thresholds without the use of a hardware processor. Alternatively, ICs, FPGAs, and/or similar devices can be used in conjunction with one or more hardware processors.

Figure 5:
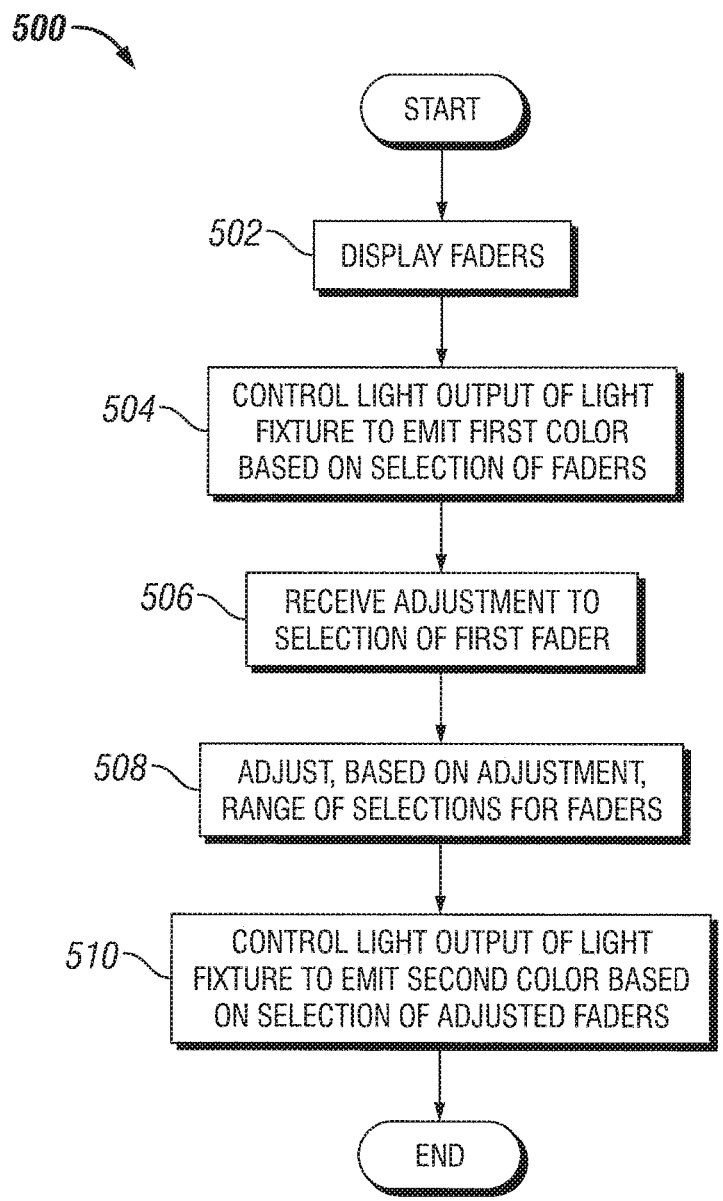
FIG. 5 shows a flowchart of a method for selecting a color using active preview color faders in accordance with certain example embodiments.

FIG. 5 shows a flowchart of a method 500 for selecting a color using active preview color faders in accordance with certain example embodiments. While the various steps in this flowchart are presented and described sequentially, one of ordinary skill will appreciate that some or all of the steps may be executed in different orders, may be combined or omitted, and some or all of the steps may be executed in parallel. Further, in one or more of the example embodiments, one or more of the steps described below may be omitted, repeated, and/or performed in a different order.

In addition, a person of ordinary skill in the art will appreciate that additional steps not shown in FIG. 5 may be included in performing this method 500. Accordingly, the specific arrangement of steps should not be construed as limiting the scope. Further, a particular computing device, as described, for example, in FIG. 6 below, can be used to perform one or more of the steps (or portions thereof) for the method 500 described below in certain exemplary embodiments.

Referring now to FIGS. 1-5, the method 500 begins at the START step and proceeds to step 502, where one or more faders 210 are displayed. The faders 210 can be displayed on an active color interface (e.g., active color interface 210A).

The faders 210 that are displayed can be based on one or more of a number of factors. For example, the faders 210 can be based on one or more devices 440 (e.g., light fixtures). In such a case, the devices 440 can be selected using the patch module 408. The patch module 408 can be driven based on instructions from a user 450, default instructions, the occurrence of some event, some other source, or any combination thereof. The patch module 408 can also select portions of a device 440. The faders 210 that are displayed can have any of a number of shapes and/or forms. The faders 210 can be generated and displayed by a color control engine 406. In certain example embodiments, there are multiple faders 210.

In step 504, the light output of the device 440 (e.g., a light fixture) is controlled to emit a first color based on a selection of the faders 210. The first color can be an overall color that can be displayed in an overall color display 217 of the active color interface 200A. The selection of the faders 210 can be the position of the selector 214 among a range 212 of selections 213 for each fader 210. The first color can be sent to the devices 440 by the color control engine 406.

In step 506, an adjustment to a selection of one of the faders 210 is received. The adjustment to a selection of one of the faders 210 can be made by a user 450 through the active color interface 200A. The adjustment can be movement of a selector 214 within the range 212 of selections 213 for that fader 210.

In step 508, the range 212 of selections 213 for the faders 210 is recalculated (adjusted). The range 212 of selections 213 for the faders 210 can be adjusted based on the adjustment to the fader 210 from step 506. With the possible exception of the fader 210 from step 506, the selections 213 of every one of the faders 210 of the active color interface 200A is recalculated (readjusted). The range 212 of selections 213 for the faders 210 can be adjusted by the color control engine 406. The color control engine 406 can also display the recalculated faders 210 on a real-time basis relative to when the faders 210 are recalculated.

In step 510, the light output of the device 440 (e.g., a light fixture) is controlled to emit a second color based on the selection of the faders 210 in step 506. The second color can be a revised overall color that can be displayed in the overall color display 217 of the active color interface 200A. The new selection of the fader 210, as described in step 506, can be the position of the selector 214 among the range 212 of selections 213 for that fader 210. The second color can be sent to the devices 440 by the color control engine 406. When step 510 is completed, the method 500 can proceed to the END step. Alternatively, the process can revert to any of the prior steps of the method 500.

Figure 6:
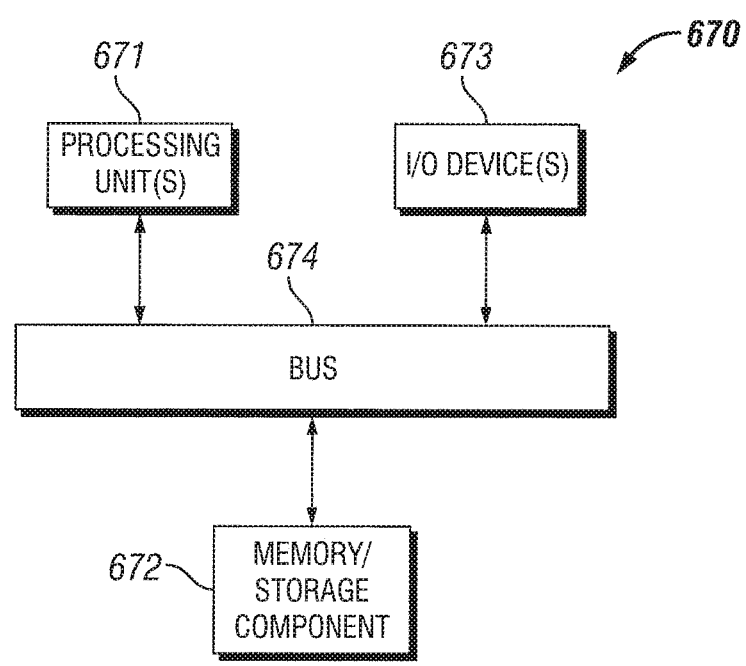
FIG. 6 shows a computing device in accordance with one or more example embodiments.

FIG. 6 illustrates one embodiment of a computing device 670 that implements one or more of the various techniques described herein, and which is representative, in whole or in part, of the elements described herein pursuant to certain exemplary embodiments. Computing device 670 is one example of a computing device and is not intended to suggest any limitation as to scope of use or functionality of the computing device and/or its possible architectures. Neither should computing device 670 be interpreted as having any dependency or requirement relating to any one or combination of components illustrated in the example computing device 670.

Computing device 670 includes one or more processors or processing units 671, one or more memory/storage components 672, one or more input/output (I/O) devices 673, and a bus 674 that allows the various components and devices to communicate with one another. Bus 674 represents one or more of any of several types of bus structures, including a memory bus or memory controller, a peripheral bus, an accelerated graphics port, and a processor or local bus using any of a variety of bus architectures. Bus 674 includes wired and/or wireless buses.

Memory/storage component 672 represents one or more computer storage media. Memory/storage component 672 includes volatile media (such as random access memory (RAM)) and/or nonvolatile media (such as read only memory (ROM), flash memory, optical disks, magnetic disks, and so forth). Memory/storage component 672 includes fixed media (e.g., RAM, ROM, a fixed hard drive, etc.) as well as removable media (e.g., a Flash memory drive, a removable hard drive, an optical disk, and so forth).

One or more I/O devices 673 allow a customer, utility, or other user to enter commands and information to computing device 670, and also allow information to be presented to the customer, utility, or other user and/or other components or devices. Examples of input devices include, but are not limited to, a keyboard, a cursor control device (e.g., a mouse), a microphone, a touchscreen, one or more physical faders (e.g., physical linear fader), and a scanner. Examples of output devices include, but are not limited to, a display device (e.g., a monitor or projector), speakers, outputs to a lighting network (e.g., DMX card), a printer, and a network card.

Various techniques are described herein in the general context of software or program modules. Generally, software includes routines, programs, objects, components, data structures, and so forth that perform particular tasks or implement particular abstract data types. An implementation of these modules and techniques are stored on or transmitted across some form of computer readable media. Computer readable media is any available non-transitory medium or non-transitory media that is accessible by a computing device. By way of example, and not limitation, computer readable media includes "computer storage media".

"Computer storage media" and "computer readable medium" include volatile and non-volatile, removable and non-removable media implemented in any method or technology for storage of information such as computer readable instructions, data structures, program modules, or other data. Computer storage media include, but are not limited to, computer recordable media such as RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which is used to store the desired information and which is accessible by a computer.

The computer device 670 is connected to a network (not shown) (e.g., a local area network (LAN), a wide area network (WAN) such as the Internet, or any other similar type of network) via a network interface connection (not shown) according to some exemplary embodiments. Those skilled in the art will appreciate that many different types of computer systems exist (e.g., desktop computer, a laptop computer, a personal media device, a mobile device, such as a cell phone or personal digital assistant, or any other computing system capable of executing computer readable instructions), and the aforementioned input and output means take other forms, now known or later developed, in other exemplary embodiments. Generally speaking, the computer system 670 includes at least the minimal processing, input, and/or output means necessary to practice one or more embodiments.

Further, those skilled in the art will appreciate that one or more elements of the aforementioned computer device 670 is located at a remote location and connected to the other elements over a network in certain exemplary embodiments. Further, one or more embodiments is implemented on a distributed system having one or more nodes, where each portion of the implementation (e.g., color control engine 406) is located on a different node within the distributed system. In one or more embodiments, the node corresponds to a computer system. Alternatively, the node corresponds to a processor with associated physical memory in some exemplary embodiments. The node alternatively corresponds to a processor with shared memory and/or resources in some exemplary embodiments.

FIGS. 7-11 show examples of a lighting system using an example active color interface 700 described herein. Referring to FIGS. 1-7, the lighting system 701 in FIG. 7 includes one or more (in this case, two) light fixtures 740 (light fixture 740-1 and light fixture 740-2), where the light fixtures 740 are a type of device described above. The lighting system 701 of FIG. 7 also includes an active color interface 700 that is communicably coupled to light fixture 740-1 and light fixture 740-2 using communication links 705. In this case, light fixture 740-1 and light fixture 740-2 are mounted to a ceiling 794 and are located in the same room.

The active color interface 700 includes six faders 710, and each fader 710 has a label 716. In this example, fader 710A has a label of "red", fader 710B has a label of "green", fader 710C has a label of "blue", fader 710D has a label of "hue", fader 710E has a label of "sat" (an abbreviation for saturation), and fader 710F has a label of "val" (an abbreviation for value). Each fader 710 of the active color interface 700 has a range 712. Specifically, fader 710A has range 712A, fader 710B has range 712B, fader 710C has range 712C, fader 710D has range 712D, fader 710E has range 712E, and fader 710F has range 712F. Each fader 710 in this case is a vertical bar.

Figure 7:
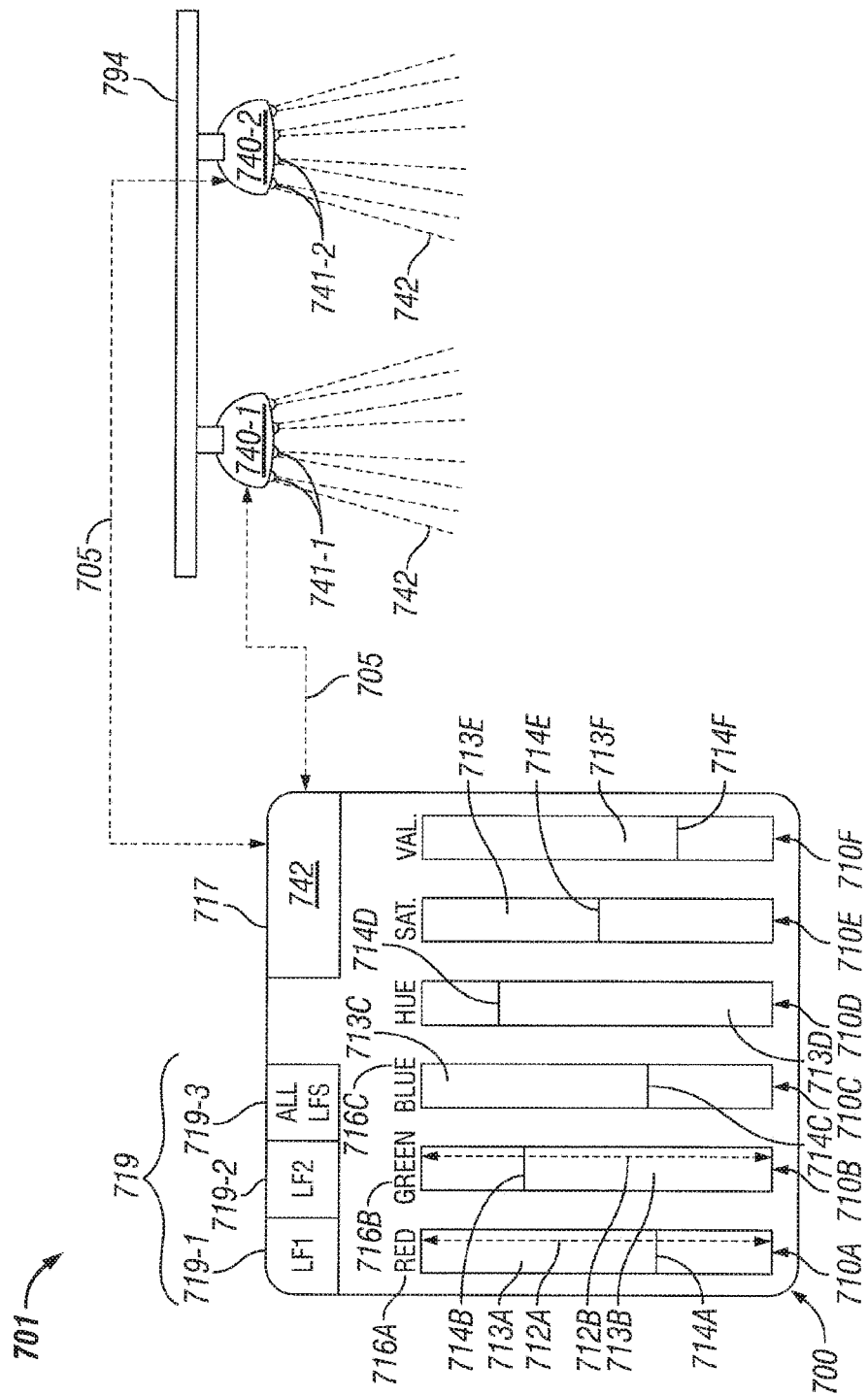
FIGS. 7-11 show an example of a lighting system using example active color interfaces described herein.

The active color interface 700 of FIG. 7 also includes three tab selections 719. Specifically, the active color interface includes tab selection 719-1 for light fixture 740-1, tab selection 719-2 for light fixture 740-2, and tab selection 719-3 for both light fixture 740-1 and light fixture 740-2. The active color interface 700 of FIG. 7 further includes an overall color display 717 that shows the overall color 742, where the overall color 742 is based on a selection within the range 712 of selections 713 by a selector 714 for each fader 710 of the active color interface 700.

In alternative embodiments, the overall color 742 shown in the overall color display 717 is based on a selection within the range 712 of selections 713 by a selector 714 for only a certain number of faders 710 of the active color interface 700. For example, the overall color 742 of FIG. 7 can be based on the selection within the range 712A of selections 713A of fader 710A, the selection within the range 712B of selections 713B of fader 710B, and the selection within the range 712C of selections 713C of fader 710C. In other words, the overall color 742 can be unaffected by the selection within the range 712D of selections 713D of fader 710D, the selection within the range 712E of selections 713E of fader 710E, and the selection within the range 712F of selections 713F of fader 710F.

Specifically, the overall color 742 is based on a combination of all six of the following: (1) the position of the selector 714A within the range 712A of selections 713A for fader 710A, which corresponds to red; (2) the position of the selector 714B within the range 712B of selections 713B for fader 710B, which corresponds to green; (3) the position of the selector 714C within the range 712C of selections 713C for fader 710C, which corresponds to blue; (4) the position of the selector 714D within the range 712D of selections 713D for fader 710D, which corresponds to hue; (5) the position of the selector 714E within the range 712E of selections 713E for fader 710E, which corresponds to saturation; and (6) the position of the selector 714F within the range 712F of selections 713F for fader 710F, which corresponds to value.

In this case, the active color interface 700 is a user interface, where a user can adjust the selector 714 associated with one or more faders 710. In some cases, a selector 714 associated with one or more faders 710 is inactive so that the user (e.g., user 450) cannot adjust the selector 714 and make a selection among the range 712 of selections 713. When this occurs, the selections 713 can still change based on a change in selection by a selector 714 associated with another fader 710. Tab selection 719-3 for both light fixture 740-1 and light fixture 740-2 is selected in this case. As a result, the overall color 742 of the active color interface 700 in FIG. 7 matches the color 742 of the output of the light sources 741-1 of light fixture 740-1 and the output of the light sources 741-2 of light fixture 740-2.

Figure 8:
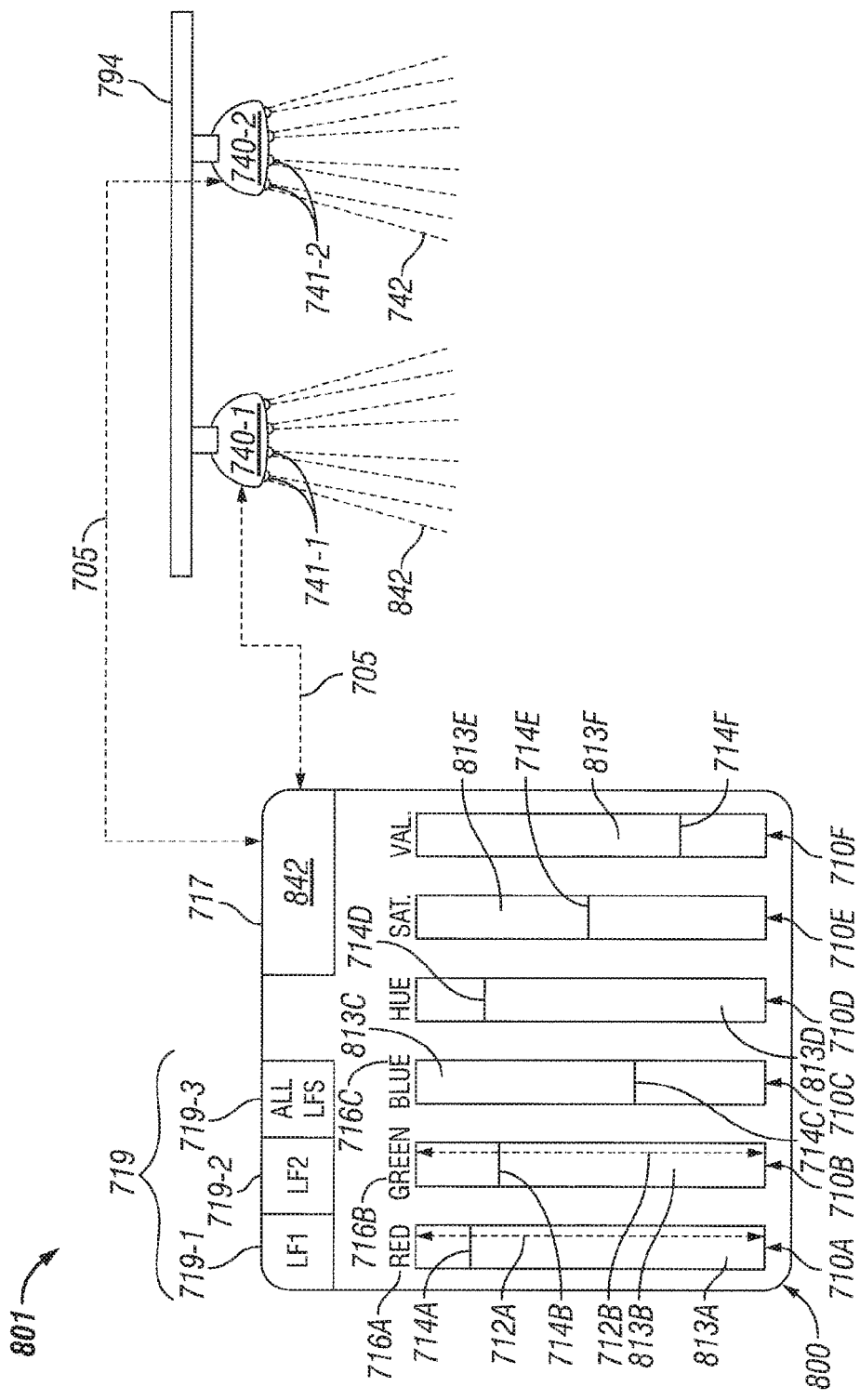

The lighting system 801 of FIG. 8 is substantially the same as the lighting system 701 of FIG. 7, except as described below. Specifically, relative to the lighting system 701 of FIG. 7, tab selection 719-1 has been selected (replacing tab selection 719-3), and the selector 714A for fader 710A has been moved. The position of none of the other selectors 714 (in this case, selector 714B, selector 714C, selector 714D, selector 714E, and selector 714F) has changed relative to FIG. 7. Since the selector 714A for fader 710A has been moved, the selections 813 for each of the faders 810 of the active color interface 800 of FIG. 8 are different compared to the corresponding selections 713 of the faders 710 of the active color interface 700 of FIG. 7.

In other words, because a new selection was made by the selector 714A within the range 712A of selections 813A for fader 710A in the active color interface 800, the selections 813 in every fader 710 (in this case, selections 813A for fader 710A, selections 813B for fader 710B, selections 813C for fader 710C, selections 813D for fader 710D, selections 813E for fader 710E, and selections 813F for fader 710F) are changed according to the position of selector 814A within the range 712A of selections 813A for fader 710A.

In some cases, when the selection of only one fader has changed, as with fader 710A in this case, the selections 813A remain unchanged. In other words, the selections 813A of FIG. 8 can be the same as the selections 713A of FIG. 7 since only the selector 714A of fader 710A has changed position between the two figures. Based on the position of the selectors 714 of the faders 710 of FIG. 8, a new overall color 842 appears in the overall color display 717.

When faders 710 are grouped into sets within the active color interface (e.g., active color interface 800), faders 710 outside of the set can react differently relative to faders 710 within the set when the position of a selector 714 of a fader 710 in the set is changed. For example, in this case, consider that fader 710A, fader 710B, and fader 710C are one set, and fader 710D, fader 710E, and fader 710F are another set. In such a case, when the selector 714A of fader 710A is moved, the selections 713B of fader 710B and the selections 713C of fader 710C can change without selector 714B or selector 714C moving from its current position. By contrast, when the selector 714A of fader 710A is moved, the selector 714D of fader 710D, the selector 714E of fader 710E, and the selector 714F of fader 714F can also move in response. In addition, or in the alternative, when the selector 714A of fader 710A is moved, the selections 713D of fader 710D, the selections 713E of fader 710E, and the selections 713F of fader 710F can change in response.

In addition, since the tab selection 719-1 has been selected (replacing tab selection 719-3) in FIG. 8, only light fixture 740-1 emits light that matches the new overall color 842 of the active color interface 800 of FIG. 8. Since light fixture 740-2 is not controlled by the active color interface 800 of FIG. 8, the light 742 emitted by the light sources 741-2 of light fixture 740-2 continues to be based on the positions of the selectors 714 among the range 712 of selectors 713 from FIG. 7.

Figure 9:
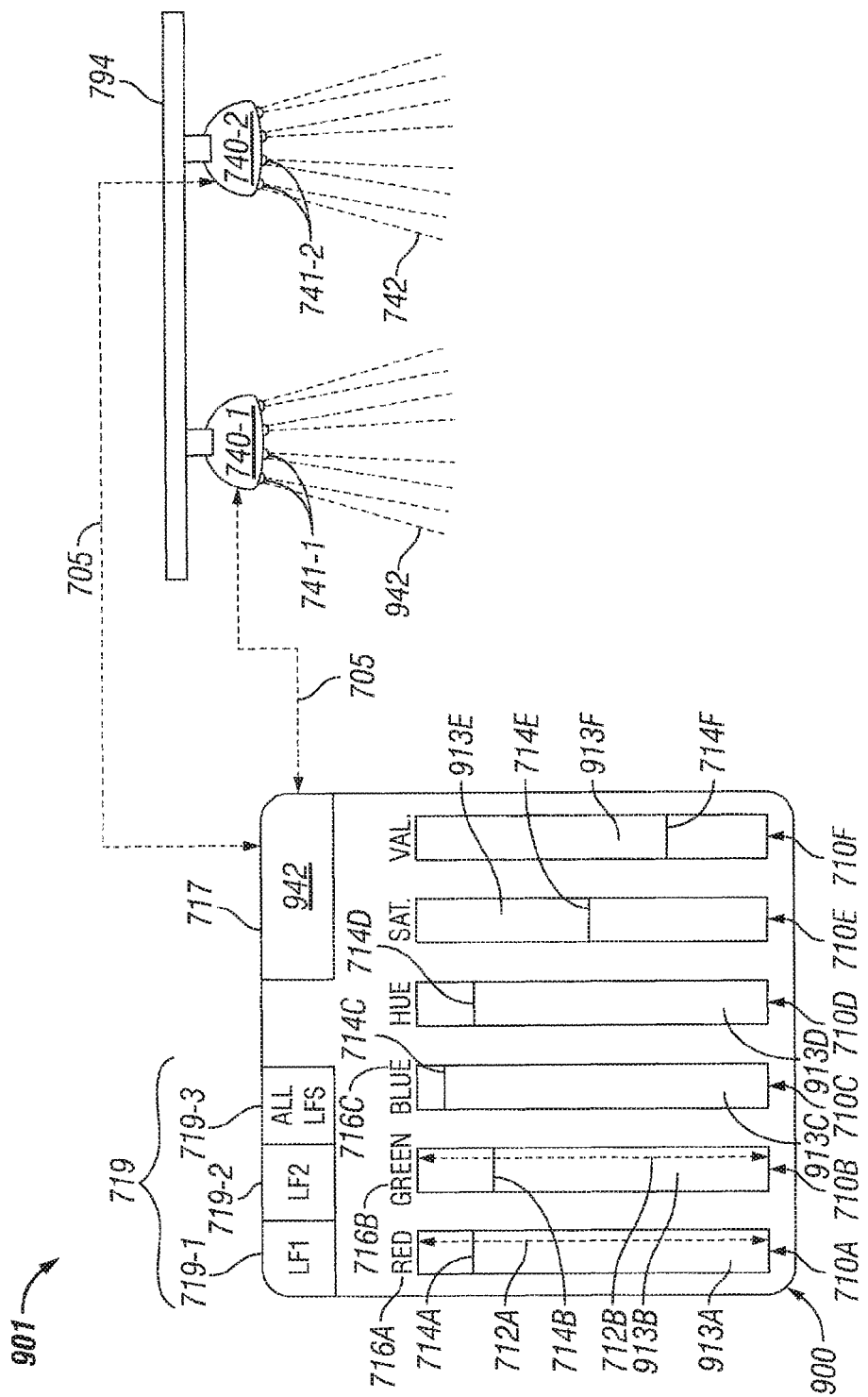

The lighting system 901 of FIG. 9 is substantially the same as the lighting system 801 of FIG. 8, except as described below. Specifically, relative to the lighting system 801 of FIG. 8, the selector 714C for fader 710C has been moved. The position of none of the other selectors 714 (in this case, selector 714A, selector 714B, selector 714D, selector 714E, and selector 714F) has changed in FIG. 9 relative to the position of those selectors 714 in FIG. 8. Since the selector 714C for fader 710C has been moved, the selections 913 for each of the faders 710 of the active color interface 900 of FIG. 9 are different compared to the corresponding selections 813 of the faders 710 of the active color interface 800 of FIG. 8.

In other words, because a new selection was made by the selector 714C within the range 712C of selections 913C for fader 710C in the active color interface 900, the selections 913 in every fader 710 (in this case, selections 913A for fader 710A, selections 913B for fader 710B, selections 913C for fader 710C, selections 913D for fader 710D, selections 913E for fader 710E, and selections 913F for fader 710F) are changed according to the position of selector 914C within the range 712C of selections 913C for fader 710C. As stated above, the selections 913C of FIG. 9 can be the same as the selections 813C of FIG. 8 since only the selector 714C of fader 710C has changed position between the two figures. Based on the position of the selectors 714 of the faders 710 of FIG. 9, a new overall color 942 appears in the overall color display 717.

In addition, since the tab selection 719-1 continues to be selected in FIG. 9, only light fixture 740-1 emits light that matches the new overall color 942 of the active color interface 900 of FIG. 9. Since light fixture 740-2 is not controlled by the active color interface 900 of FIG. 9, the light 742 emitted by the light sources 741-2 of light fixture 740-2 continues to be based on the positions of the selectors 714 among the range 712 of selectors 713 from FIG. 7.

Figure 10:
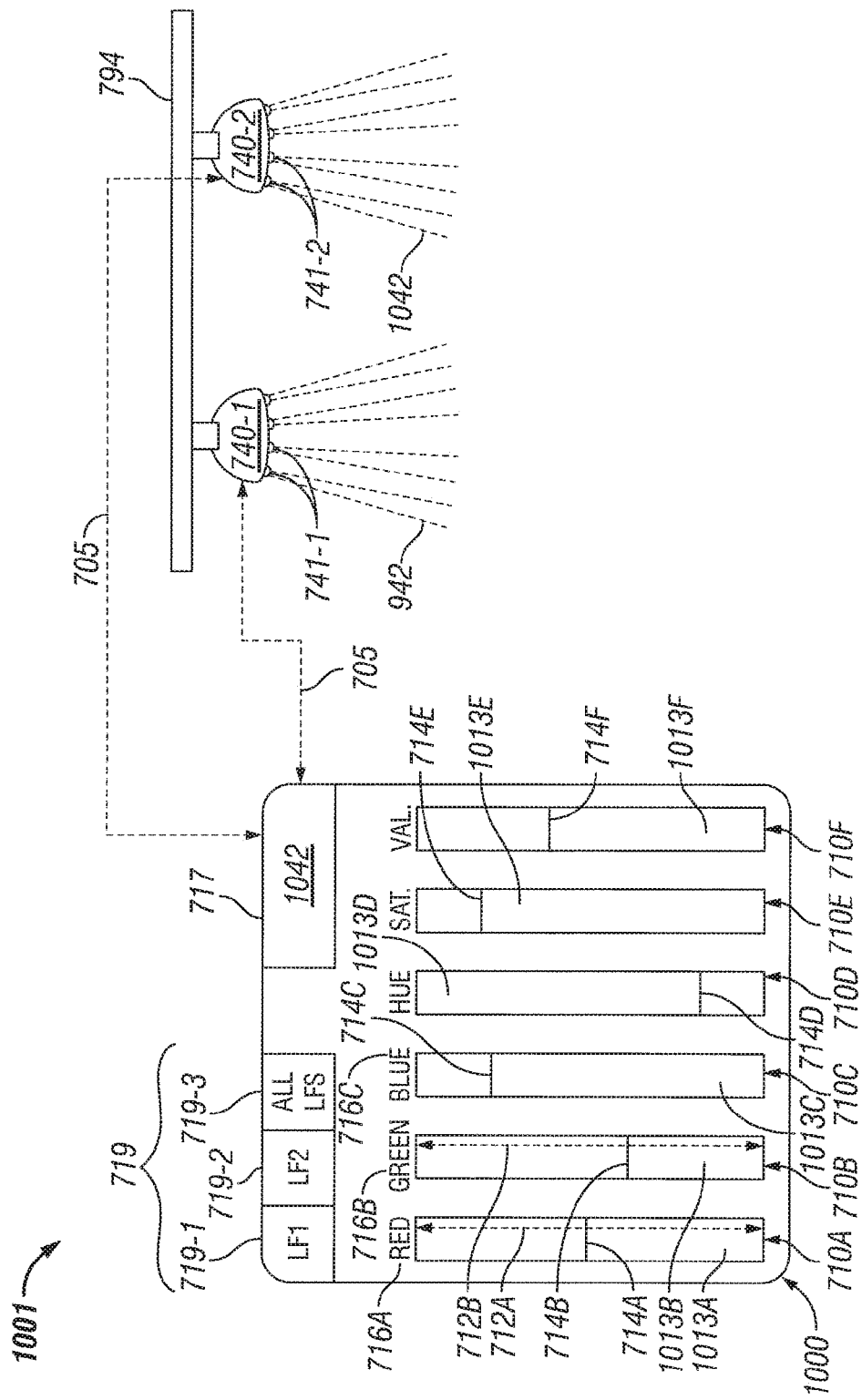

The lighting system 1001 of FIG. 10 is substantially the same as the lighting system 901 of FIG. 9, except as described below. Specifically, relative to the lighting system 801 of FIG. 8, tab selection 719-2 has been selected (replacing tab selection 719-1), and every selector 714 of every fader 710 in FIG. 10 has been moved. In other words, the position of selector 714A, selector 714B, selector 714C, selector 714D, selector 714E, and selector 714F has changed in FIG. 10 relative to the position of those selectors 714 in FIG. 9. Since at least one of the selectors 714 has been moved in FIG. 10, the selections 1013 for each of the faders 710 of the active color interface 1000 of FIG. 10 are different relative to the corresponding selections 913 of the faders 710 of the active color interface 900 of FIG. 9.

In other words, because a new selection was made by each of the selectors 714 within the corresponding range 712 of selections 1013 for corresponding fader 710 in the active color interface 1000, the selections 1013 in every fader 710 (in this case, selections 1013A for fader 710A, selections 1013B for fader 710B, selections 1013C for fader 710C, selections 1013D for fader 710D, selections 1013E for fader 710E, and selections 1013F for fader 710F) are changed according to the position of selectors 1014.

Based on the position of the selectors 714 of the faders 710 of FIG. 10, a new overall color 1042 appears in the overall color display 717. In addition, since the tab selection 719-2 is now selected in FIG. 10, only light fixture 740-2 emits light that matches the new overall color 1042 of the active color interface 1000 of FIG. 10. Since light fixture 740-1 is not controlled by the active color interface 1000 of FIG. 10, the light 942 emitted by the light sources 741-1 of light fixture 740-1 continues to be based on the positions of the selectors 714 among the range 712 of selectors 913 from FIG. 9.

Figure 11:
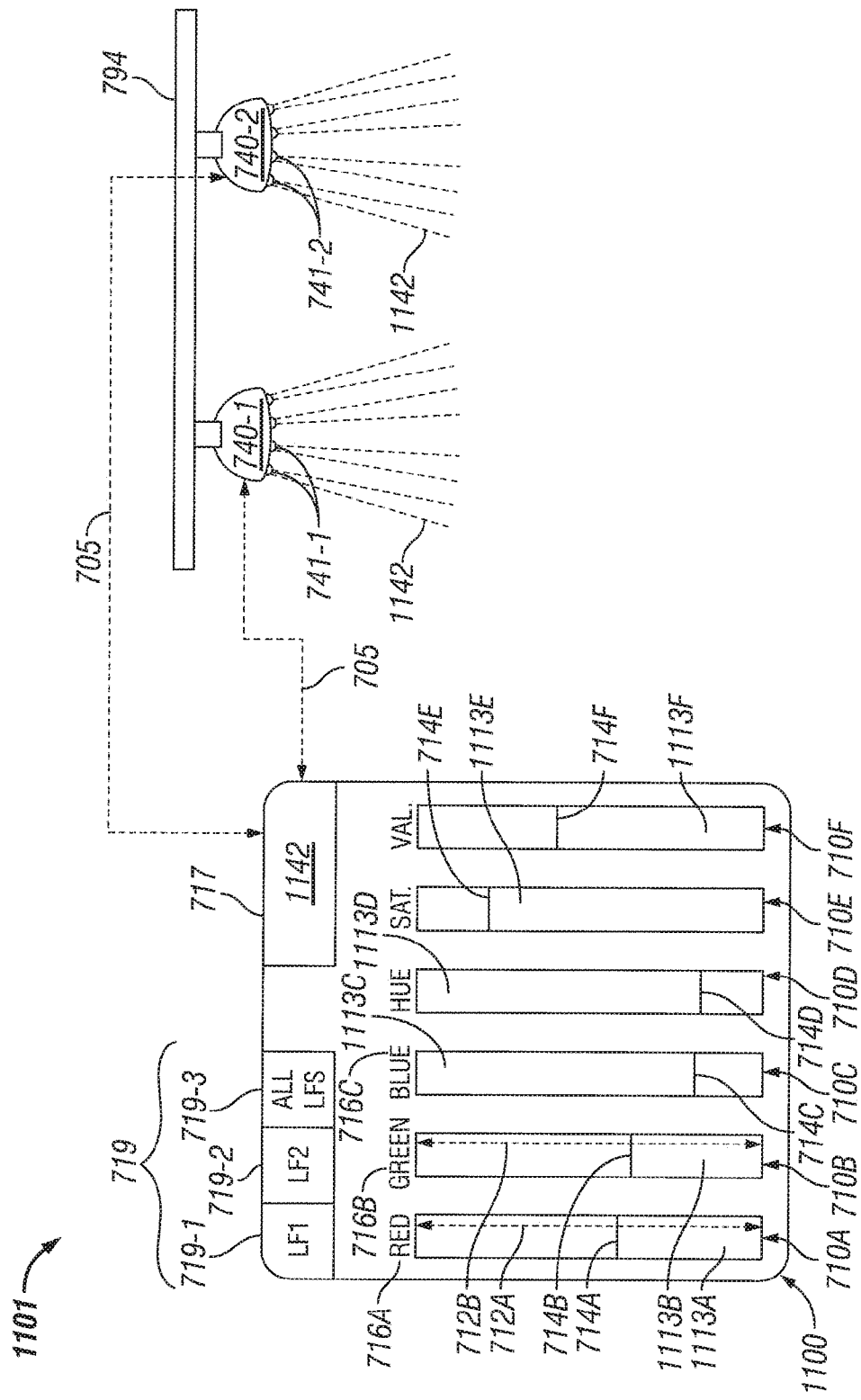

The lighting system 1101 of FIG. 11 is substantially the same as the lighting system 1001 of FIG. 10, except as described below. Specifically, relative to the lighting system 1001 of FIG. 10, tab selection 719-3 has been selected (replacing tab selection 719-2), the selector 714C for fader 710C has been moved. The position of none of the other selectors 714 (in this case, selector 714A, selector 714B, selector 714D, selector 714E, and selector 714F) has changed in FIG. 11 relative to the position of those selectors 714 in FIG. 10. Since the selector 714C for fader 710C has been moved, the selections 1113 for each of the faders 710 of the active color interface 1100 of FIG. 11 are different compared to the corresponding selections 1013 of the faders 710 of the active color interface 1000 of FIG. 10.

In other words, because a new selection was made by the selector 714C within the range 712C of selections 1113C for fader 710C in the active color interface 1100, the selections 1113 in every fader 710 (in this case, selections 1113A for fader 710A, selections 1113B for fader 710B, selections 1113C for fader 710C, selections 1113D for fader 710D, selections 1113E for fader 710E, and selections 1113F for fader 710F) are changed according to the position of selector 1114C within the range 712C of selections 1113C for fader 710C. As stated above, the selections 1113C of FIG. 11 can be the same as the selections 1013C of FIG. 10 since only the selector 714C of fader 710C has changed position between the two figures.

Based on the position of the selectors 714 of the faders 710 of FIG. 11, a new overall color 1142 appears in the overall color display 717. In addition, since the tab selection 719-3 is now selected in FIG. 11, both light fixture 740-1 and light fixture 740-2 emits light that matches the new overall color 1142 of the active color interface 1100 of FIG. 11.

Example embodiments provide a number of benefits. Examples of such benefits include, but are not limited to, more intuitive and real-time feedback about the effect of a change in one color component on the remaining color components for a color. As a result, example embodiments allow for a proper or desired color to be established more quickly and without the need for trial and error, as in the current art.

Although embodiments described herein are made with reference to example embodiments, it should be appreciated by those skilled in the art that various modifications are well within the scope and spirit of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. An active color interface comprising:
   a first fader of a plurality of faders, wherein the first fader comprises a first selector and a first range of first selections, wherein the first range of first selections provides a first visual image of the first selections available to the first selector; and
   a second fader of the plurality of faders, wherein the second fader comprises a second selector and a second range of second selections, wherein the second range of second selections provides a second visual image of the second selections available to the second selector,
   wherein the first range of first selections and the second range of second selections are altered when the second selector moves among the second range of second selections,
   wherein the first range of first selections and the second range of second selections are altered when the first selector moves among the first range of first selections, and
   wherein at least one light source of at least one lighting device emits an overall color that corresponds to a first selection among the first range of first selections by the first selector and a second selection among the second range of second selections by the second selector.

2. The active color interface of claim 1, further comprising:
   a third fader of the plurality of faders, wherein the third fader comprises a third selector and a third range of third selections;
   wherein the second range of second selections and the third range of third selections are altered when the first selector moves among the first range of first selections,
   wherein the first range of first selections and the third range of third selections are altered when the second selector moves among the second range of second selections, and
   wherein the first range of first selections and the second range of second selections are altered when the third selector moves among the third range of third selections.

3. The active color interface of claim 1, wherein the plurality of faders comprises red, green, and blue.

4. The active color interface of claim 1, wherein the plurality of faders comprises cyan, magenta, and yellow.

5. The active color interface of claim 1, wherein the plurality of faders comprises hue, saturation, and value.

6. The active color interface of claim 1, wherein the plurality of faders comprises white and amber.

7. The active color interface of claim 1, wherein the first range of selections corresponds to at least one color parameter.

8. The active color interface of claim 1, further comprising:
   a display of the overall color.

9. The active color interface of claim 1, wherein the first selector and the second selector show the overall color based on a first position of the first selector among the first range of first selections and a second position of the second selector among the second range of second selections.

10. The active color interface of claim 1, wherein the first fader comprises a first portion and a second portion, wherein the first portion comprises a first range of passive selections, and wherein the second portion comprises a first range of active selections.

11. The active color interface of claim 1, wherein at least one inactive fader of the plurality of faders comprises a selector that remains affixed to a default selection.

12. The active color interface of claim 11, wherein the at least one inactive fader comprises a third selector that is unchangeable by a user.

13. The active color interface of claim 11, wherein a third range of selections of the at least one inactive fader is altered when the first selector moves.

14. The active color interface of claim 1, further comprising:
   a plurality of tab selections, wherein the at least one light fixture comprises a plurality of light fixtures, wherein each tab selection corresponds to a light fixture of the plurality of light fixtures.

15. A system for selecting a color, the system comprising:
   a light fixture comprising at least one light source; and
   an active color interface communicably coupled to the light fixture, wherein the active color interface comprises:
      a hardware processor;
      a color control engine communicably coupled to the light fixture, wherein the color control engine executes instructions on the hardware processor; and
      a plurality of faders generated by the color control engine, wherein the plurality of faders comprises a plurality of selections based on the at least one light source,
      wherein each of the plurality of selections is adjusted by the color control engine based on a position of a selector among each of the plurality of selections of the plurality of faders, and
   wherein light emitted by the at least one light source corresponds to the position of each selector relative to the plurality of selections of the plurality of faders.

16. The system of claim 15, further comprising:
   a patch module coupled to the color control engine, wherein the patch module provides light fixture information for the at least one light fixture to the color control engine, wherein the light fixture information is used to generate the plurality of faders.

17. The system of claim 15, wherein the active color interface further comprises a touchscreen.

18. A non-transitory computer accessible storage medium comprising computer readable program code embodied therein for a method for selecting a color using active preview color faders, the method comprising:
   displaying a plurality of faders, wherein each fader of the plurality of faders comprises a selector positioned at a first selection along a range of selections for the first fader;
   controlling a light output of a light fixture to emit a first color, wherein the first color matches a first overall color that combines the first selection of the plurality of faders;
   receiving a first adjustment to the selector of a first fader of the plurality of faders, wherein the first adjustment moves the selector of the first fader from the first selection to a second selection along the range of selections for the first fader;
   adjusting, based on the first adjustment, the range of selections for each of the plurality of faders to generate a plurality of adjusted faders; and controlling the light output of the light fixture to emit a second color, wherein the second color matches a second overall color that combines the second selection of the first fader and the first selection of a remainder of the plurality of adjusted faders.

19. The non-transitory computer accessible storage medium of claim 18, wherein the method further comprises:
receiving a second adjustment to the selector of a second fader of the plurality of adjusted faders, wherein the second adjustment moves the selector of the second fader from the first selection to a third selection along the range of selections for the second fader;
adjusting, based on the second adjustment, the selection of each of the plurality of adjusted faders to generate a plurality of readjusted faders; and
controlling the light output of the light fixture to emit a third color, wherein the third color matches a third overall color that combines the third selection of the second fader, the second selection of the first fader, and the first selection of the remainder of the plurality of readjusted faders.

20. The non-transitory computer accessible storage medium of claim 18, wherein the light output of the light fixture determines the range of selections for the plurality of faders.

* * * * *